United States Patent
Yang

(10) Patent No.: US 8,225,699 B2
(45) Date of Patent: Jul. 24, 2012

(54) SUN GEAR COAXIALLY DRIVEN SCREW AND NUT STRUCTURE

(76) Inventor: Tai-Her Yang, Dzan-Hwa (TW)

( * ) Notice: Subject to any disclaimer, the term of this patent is extended or adjusted under 35 U.S.C. 154(b) by 316 days.

(21) Appl. No.: 12/461,525

(22) Filed: Aug. 14, 2009

(65) Prior Publication Data

US 2011/0036207 A1    Feb. 17, 2011

(51) Int. Cl.
*B25B 17/02* (2006.01)
*B25B 13/48* (2006.01)

(52) U.S. Cl. ................................. 81/56; 81/55

(58) Field of Classification Search ............. 81/56, 57, 81/55
See application file for complete search history.

(56) References Cited

U.S. PATENT DOCUMENTS

| | | | | |
|---|---|---|---|---|
| 1,343,667 A * | 6/1920 | Evensen | ............ | 81/56 |
| 2,537,382 A * | 1/1951 | Valentin | ............ | 81/56 |
| 2,955,496 A * | 10/1960 | La Torre | ............ | 81/56 |
| 3,472,083 A * | 10/1969 | Schnepel | ............ | 475/317 |
| 3,916,734 A * | 11/1975 | Sawan | ............ | 81/56 |
| 3,942,398 A * | 3/1976 | Fletcher et al. | ............ | 81/56 |
| 3,979,965 A * | 9/1976 | Vuceta | ............ | 74/410 |
| 4,403,529 A * | 9/1983 | Ikeda et al. | ............ | 81/56 |
| 5,123,308 A * | 6/1992 | Shaffer | ............ | 81/57.31 |
| 5,238,461 A * | 8/1993 | Gotman | ............ | 475/248 |
| 5,354,246 A * | 10/1994 | Gotman | ............ | 475/248 |
| 5,582,079 A * | 12/1996 | Matsumura et al. | ............ | 81/56 |
| 5,953,965 A * | 9/1999 | Kaneyama et al. | ............ | 81/55 |
| 5,964,128 A * | 10/1999 | Kaneyama et al. | ............ | 81/56 |
| 6,058,810 A * | 5/2000 | Junkers | ............ | 81/56 |
| 6,487,940 B2 * | 12/2002 | Hart et al. | ............ | 81/57.14 |
| 7,225,707 B2 * | 6/2007 | Knopp | ............ | 81/57 |
| 7,794,355 B2 * | 9/2010 | Pusateri | ............ | 475/331 |
| 7,987,745 B2 * | 8/2011 | Gauthier et al. | ............ | 81/57.31 |
| 2010/0018366 A1 * | 1/2010 | Hu | ............ | 81/436 |
| 2010/0180731 A1 * | 7/2010 | Gauthier et al. | ............ | 81/57 |

* cited by examiner

*Primary Examiner* — David B Thomas

(74) *Attorney, Agent, or Firm* — Bacon & Thomas, PLLC

(57) ABSTRACT

The planetary gear coaxially driven screw and nut structure of the present invention is to install the inner ring gear in the nut and install at least one of the radial arm structures of the planetary gear in the bolt; and by means of coaxial drive of the sun gear with the nut center, effects locking or loosening operation of the screw and nut set or screw structure.

9 Claims, 6 Drawing Sheets

SUN GEAR COAXIALLY DRIVEN SCREW AND NUT STRUCTURE

BACKGROUND OF THE INVENTION (a) Field of the Invention

Traditional planetary gear type magnification lock, adjust or disassembly screw and nut set or screw device is to install the inner ring gear in the nut, and the cylindrical sun gear in the bolt. Driving the planetary gear further drives the inner ring gear-equipped nut to lock or loosen. However, when the aforementioned structure locks or loosens the nut, the axial position of the planetary gear that exerted the force must travel. This operation is relatively inconvenient and involves a bigger space. The planetary gear coaxially driven screw and nut structure of the present invention is to install the inner ring gear in the nut and install at least one of the radial arm structures of the planetary gear in the bolt; and by means of coaxial drive of the sun gear with the nut center, effects locking or loosening operation of the screw and nut set or screw structure.

(b) Description of the Prior Art

Traditional planetary gear type magnification lock, adjust or disassembly screw and nut set or screw device is to install the inner ring gear in the nut, and the cylindrical sun gear in the bolt. Driving the planetary gear further drives the inner ring gear-equipped nut to lock or loosen. However, when the aforementioned structure locks or loosens the nut, the axial position of the planetary gear that exerted the force must travel. This operation is relatively inconvenient and involves a bigger space.

SUMMARY OF THE INVENTION

The sun gear coaxially driven screw and nut structure of the present invention is to install the inner ring gear in the nut and install at least one of the radial arm structures of the planetary gear in the bolt; and by means of coaxial drive of the sun gear with the nut center, effects locking or loosening operation of the screw and nut set or screw structure.

DESCRIPTION OF MAIN COMPONENT SYMBOLS (100): Cover
(101): Drivable Nut
(102): Inner Ring Gear
(112): Inner Thread
(121): Sun Gear Cylinder
(122): Cylindrical Tooth Tip
(124): Polygonal Through Hole or Blind Hole
(124'): Polyhedral cylinder
(125): Boss
(126): Axial Blind Hole
(128): Jack Post
(130): Axial hole
(131): Planetary Gear
(140): Stud
(142): Thread
(143): Inner polygonal hole
(200): Structure
(300): Fixed element

DETAILED DESCRIPTION OF THE PREFERRED EMBODIMENTS

Traditional planetary gear type magnification lock, adjust or disassembly screw and nut set or screw device is to install the inner ring gear in the nut, and the cylindrical sun gear in the bolt. Driving the planetary gear further drives the inner ring gear-equipped nut to lock or loosen. However, when the aforementioned structure locks or loosens the nut, the axial position of the planetary gear that exerted the force must travel. This operation is relatively inconvenient and involves a bigger space. The planetary gear coaxially driven screw and nut structure of the present invention is to install the inner ring gear in the nut and install at least one of the radial arm structures of the planetary gear in the bolt; and by means of coaxial drive of the sun gear with the nut center, effects locking or loosening operation of the screw and nut set or screw structure.

Figure 1:
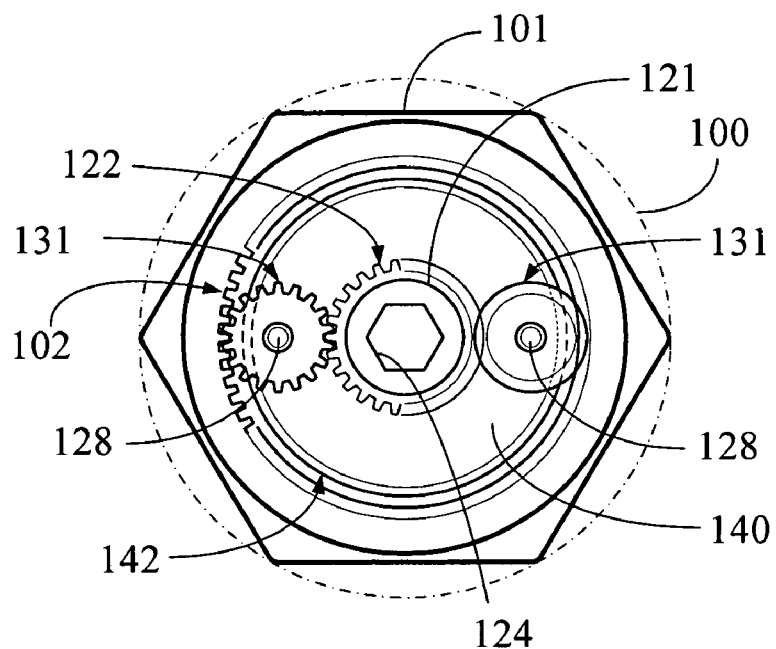
FIG. 1 is the top cross-sectional view of the present invention

FIG. 1 is the top cross-sectional view of the present invention.

Figure 2:
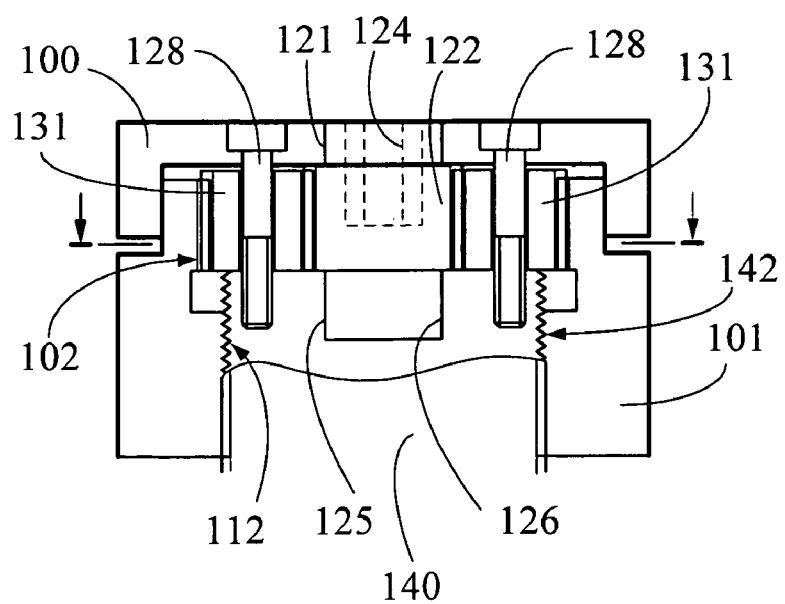
FIG. 2 is the cross-sectional view of the present invention

FIG. 2 is the cross-sectional view of the present invention.

Figures 3, 4:
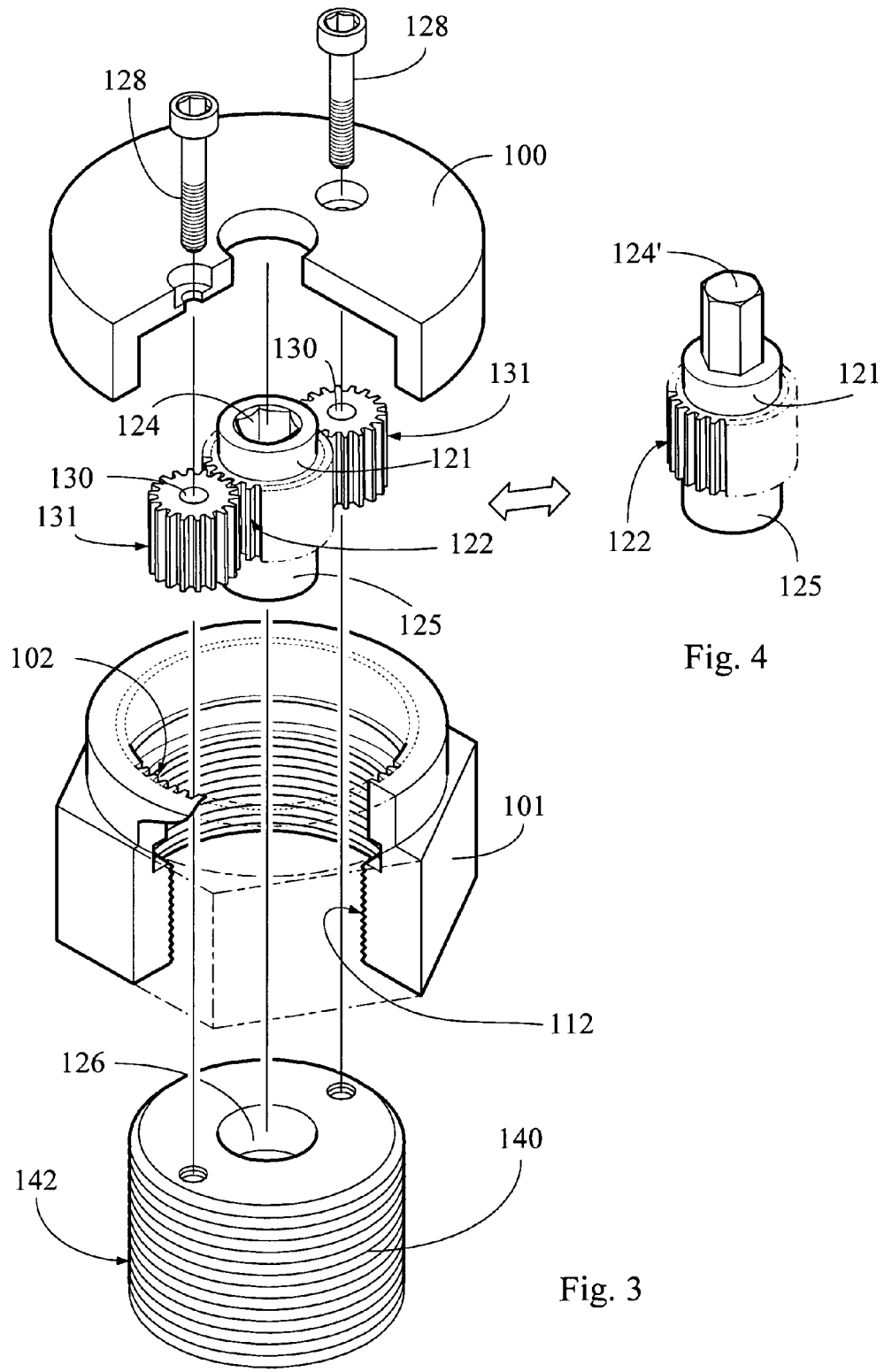
FIG. 3 is the dimensional view of the present invention
FIG. 4 is a dimensional view of the polyhedral cylinder (124') replacing the polygonal through hole or blind hole (124) in FIG. 1 to FIG. 3 of the present invention

FIG. 3 is the dimensional view of the present invention.

As shown in FIG. 1 to FIG. 3, the main components of the present invention are:

Cover (100): A bottle-cap shape structure that locks on the stud (140) by means of the jack post (128), and by covering onto the top section outer ring of the drivable nut (101) provides a protection for the planetary gear set.

Drivable nut (101): A ring shape structure with its an integrated inner ring top sectional structure or installed with an inner ring gear (102) in an assembly manner. The lower section of the structure has inner threads (112) to couple with the thread (142) of the stud (140) so that when the sun gear cylinder (121) is driven, and in turn, drives the inner ring gear (102) through the planetary gear (131), the drivable nut (101) is loosen or locked by its rotating or counter-rotating motion.

The outer part of the stud (140) has a thread (142) to couple with the inner thread (112) of the drivable nut (101). The upper part of the head of the stud (140) is installed with one or more jack posts (128) for the planetary gear (131) to effect rotary operation. Axial blind hole (126) is installed in the head of the stud (140) to allow the boss (125) at the lower end of the sun gear cylinder (121) to rotate in it;

Planetary gear (131): Installed with axial hole (130) for coupled rotation with jack post (128) and for coupling among the sun gear of the sun gear cylinder (121) and the inner ring gear (102) of the drivable nut (101) in order to form an interactive planetary gear set function.

The coupling manner of the aforementioned planetary gear (131) and the head of stud (140) are also structurally reversible. A coaxial boss is installed in the planetary gear (131) to couple and rotate with an axial hole installed at the top of the stud head.

The aforementioned installation is comprised of at least one jack post (128) and planetary gear (131).

Sun gear cylinder (121): The sun gear cylinder (121) is a cylindrical structure with its integrated top section or formed into cylindrical tooth tip (122) by assembly method. Installed along the axial center of the sun gear cylinder (121) is a polygonal through hole or blind hole (124) for coupling with outside tools; or it becomes a polyhedral cylinder (124') structure to accept drive by coupled tools.

Figure 5:
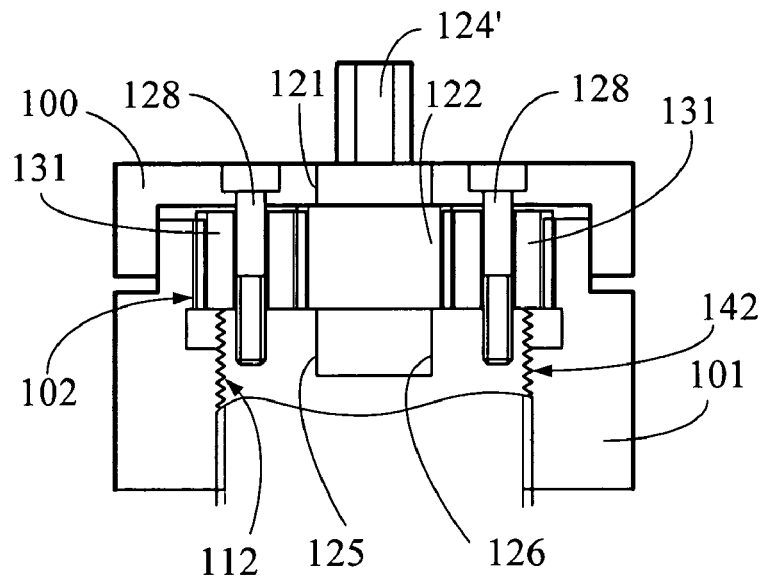
FIG. 5 is a sectional view of the installation of polyhedral cylinder (124') in FIG. 1 to FIG. 3 of the present invention

FIG. 4 is a dimensional view of the polyhedral cylinder (124') replacing the polygonal through hole or blind hole (124) in FIG. 1 to FIG. 3; FIG. 5 is the cross-sectional view of the installation of the polyhedral cylinder (124') in FIG. 1 to FIG. 3.

If the polygonal through hole or blind hole (124) along the axial center of the sun gear cylinder (121) are through holes and inner polygonal hole (143) is installed on the stud (140), then they will allow polygonal wrench from the outside to be inserted in so that they can couple with the inner polygonal hole (143) of the stud (140) to make rotary drives.

The lower end of the sun gear cylinder (121) has a boss (125) to couple with the axial blind hole (126) at the top of the stud (140) for rotation. Sun gear cylinder (121) can accept drive from a separated and randomly coupling operational tool; or the operational tool can form an assembly with the sun gear cylinder (121) or be integrated as one structure.

The aforementioned sun gear coaxially driven screw and nut structure, wherein the boss (125) installed on the sun gear cylinder (121) and the axle blind hole (126) installed in the head of the stud (140) couple to make relative rotation being as another structural method that can be an interchanged installation between the boss (125) and the axial blind hole (126).

The aforementioned sun gear coaxially driven screw and nut structure, wherein the inner polygonal hole (143) can also be installed on the axle blind hole (126) at the head of the stud (140) for coupling with the protruded polyhedral cylinder which is opposite to the boss (125) installed on the sun gear cylinder (121).

Figure 6:
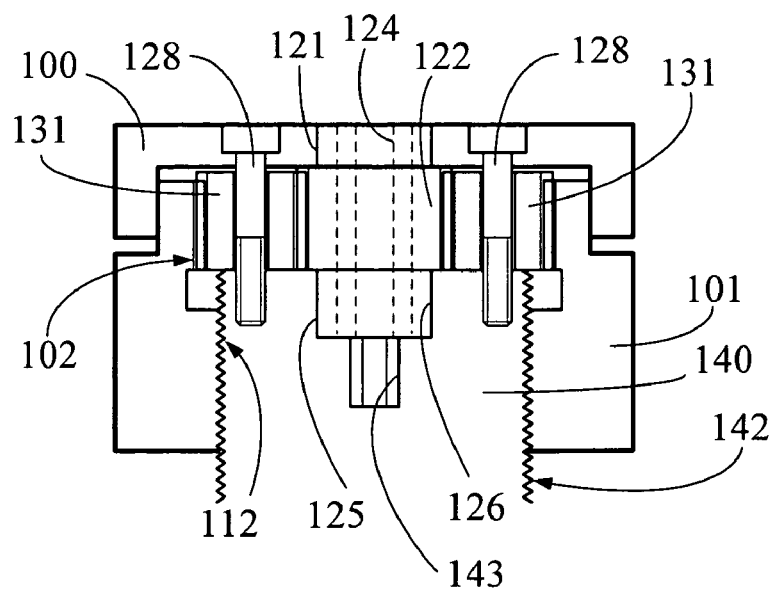
FIG. 6 is a cross-sectional view of the axial blind hole (126) being installed with inner polygonal hole (143) in FIG. 1 to FIG. 3
Figure 7:
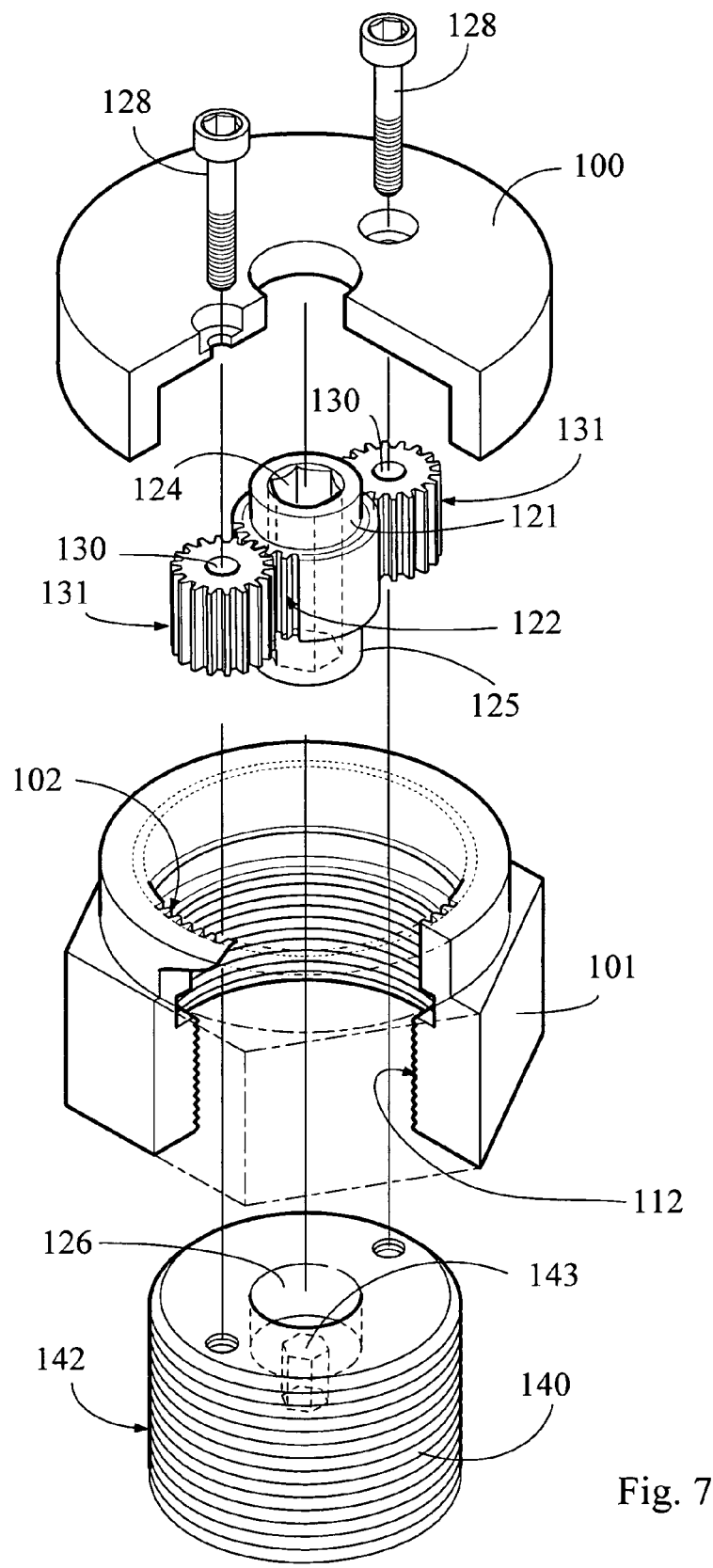
FIG. 7 is the dimensional view of FIG. 6

The cross-sectional view in FIG. 6 shows the installation of the inner polygonal hole (143) in the axial blind hole (126) in FIG. 1 to FIG. 3. FIG. 7 is the dimensional exploded view of FIG. 6.

The present invention of a sun gear coaxially driven screw and nut structure relies on manpower or a fluid motor or mechanical power or an electric motor driving operational tool to drive the sun gear cylinder (121); and to further drive the drivable nut (101) with the inner ring gear (102) through the planetary gear (131). According to the speed reduction multiples of the planetary gear set, a magnification effect is produced to drive the drivable nut (101) and to screw onto the thread (142) of the stud (140) for locking or loosening.

Figure 8:
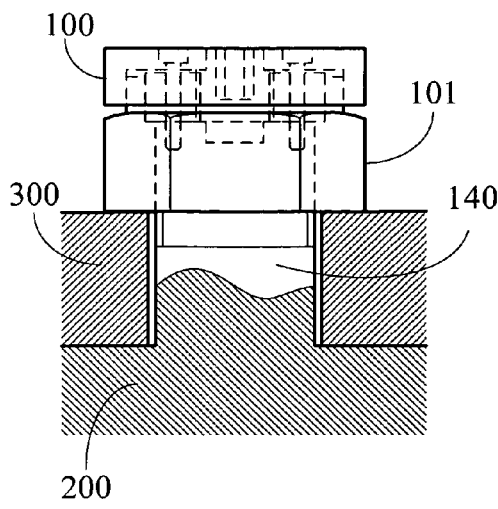
FIG. 8 is a functional view of the driven stud (140) being welded on the structure (200)
Figure 9:
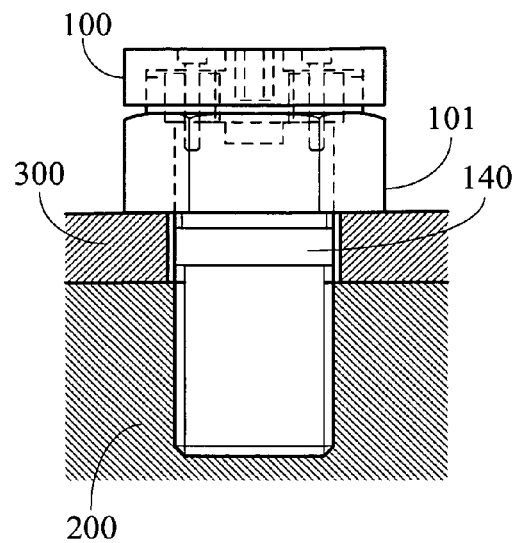
FIG. 9 is a functional view of the stud (140) being screwed on the screw hole of the structure (200) of the present invention
Figure 10:
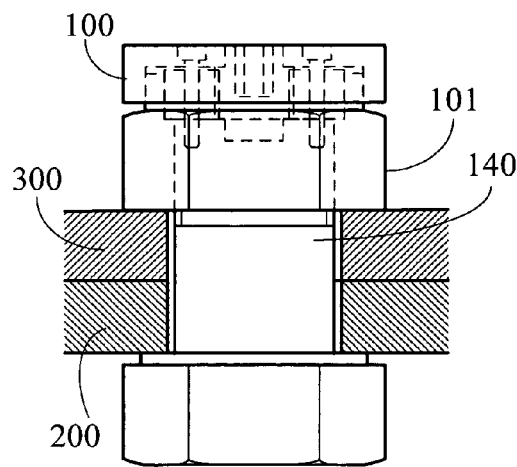
FIG. 10 is a functional view of the present invention showing the stud (140) penetrating the structure with the other end installed with a nut
Figure 11:
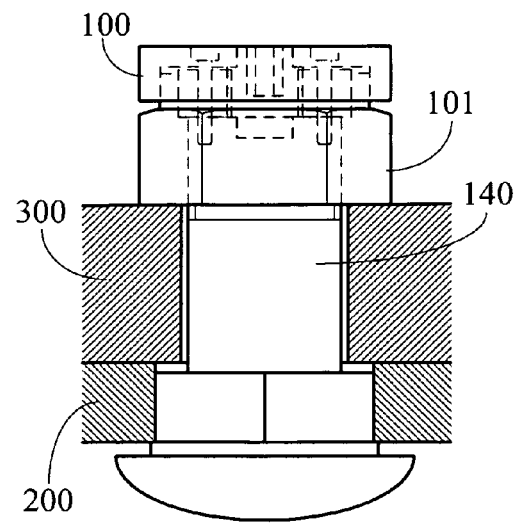
FIG. 11 is a functional view of the stud (140) of the present invention penetrating through the structure (200) with a limit stud bolt head at the other end
Figure 12:
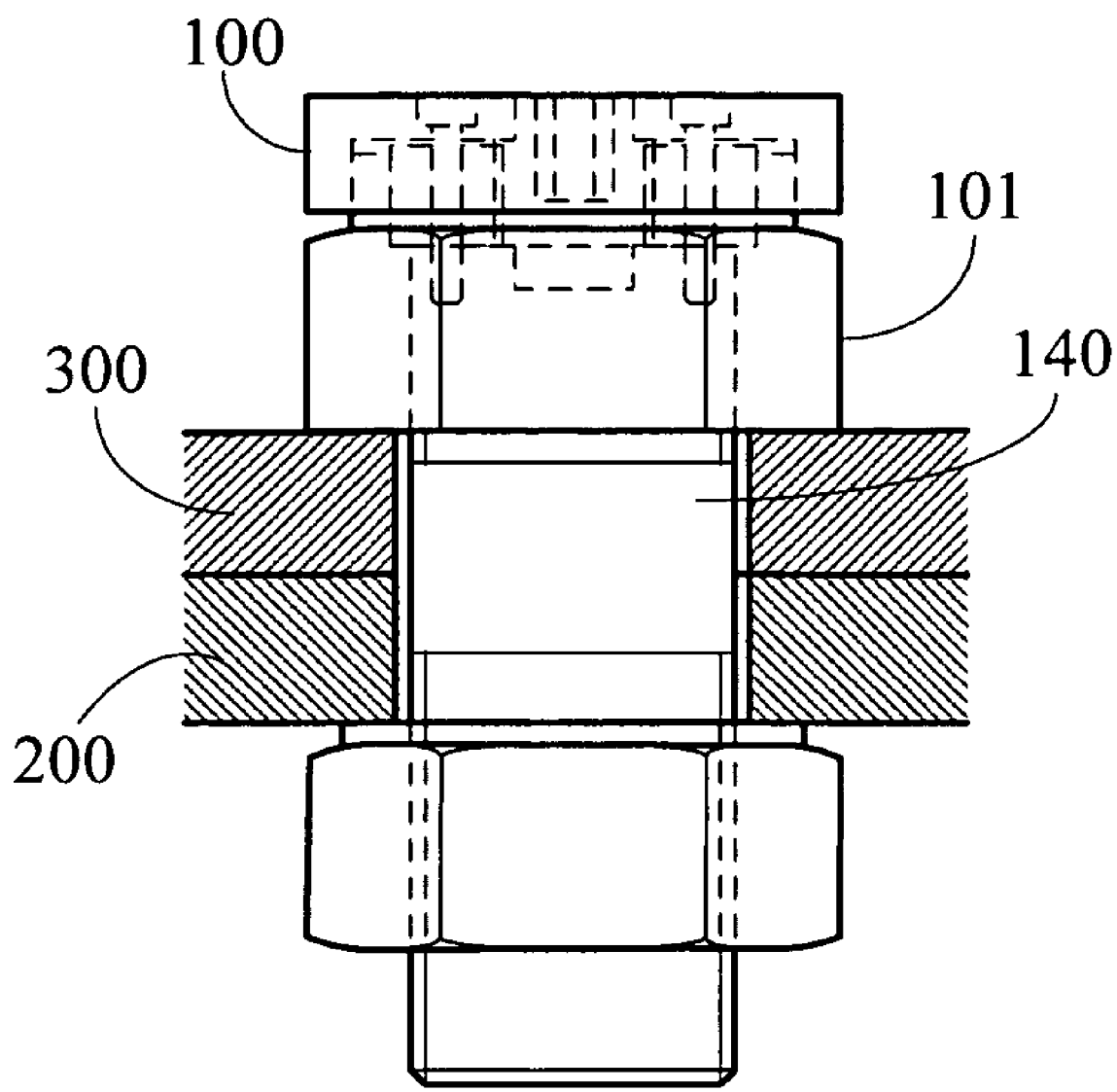
FIG. 12 is a functional view of the present invention showing both ends of the stud (140) installed with nuts (101)

Anti-vibration padding ring or gasket is optionally installed in the space between the drivable nut (101) and the stud (140) of the sun gear coaxially driven screw and nut structure or the nut is directly screwed on the thread (142) of the stud (140). The bottom end of the stud (140) serves as:

1) The stud (140) is welded on the structure (200) and the nut (101) is screwed on the stud (140) to lock or release the fixed element (300), its characteristics is that the stud is facing towards the rear end of the tool, and it contains an inner polygonal hole or polyhedral; FIG. 8 is a functional view of the present invention showing the driven stud (140) being welded on the structure (200); or 2) The stud (140) is screwed into the screw hole of the structure (200) by means of the stud structure and the nut (101) is screwed on the stud (140) in order to lock or release the fixed element (300), its characteristics is that the stud is facing towards the rear end of the tool, and it contains an inner polygonal hole or polyhedral; FIG. 9 is a functional view of the present invention showing the stud (140) being screwed into the screw hole of the structure (200); or 3) The stud (140) penetrates through the structure (200) with a nut at the other end joined to the structure (200); the nut (101) serves to screw onto the stud (140) in order to lock or release the fixed element (300), its characteristics is that the stud is facing towards the rear end of the tool, and it contains an inner polygonal hole or polyhedral; FIG. 10 is a functional view of the present invention showing the stud (140) penetrating the structure with the other end installed with a nut; or 4) The stud (140) penetrates through the structure (200) with a limit stud bolt head at the other end joined to the structure (200); the nut (101) serves to screw on the stud (140) in order to lock or release the fixed element (300), its characteristics is that the stud is facing towards the rear end of the tool, and it contains an inner polygonal hole or polyhedral; FIG. 11 is a functional view of the present invention showing the stud (140) penetrating through the structure (200) with a limit stud bolt head at the other end; or 5) The stud (140) penetrates through the structure (200) and the fixed element (300), and nuts (101) are screwed on both ends of the stud (140) in order to lock or release the fixed element (300), its characteristics is that the stud is facing towards the rear end of the tool, and it contains an inner polygonal hole or polyhedral; FIG. 12 is the functional view of the present invention showing both ends of the stud (140) installed with nuts (101);

The sun gear coaxially driven screw and nut structure is a drive operational tool that employs one or more driving method of operational drive on the sun gear cylinder (121) and/or stud (140) including:

1) one directional or reverse rotary drive;

2) reciprocating type one-way drive in which one driving direction produces driving effect while the other does not produce driving effect;

3) reciprocating type one-way drive in which one driving direction is chosen to produce driving effect while the other direction does not produce driving effect.

The driving method of sun gear cylinder (121) and/or the stud (140) of the sun gear coaxially driven screw and nut structure includes relying on the protruding polyhedral cylinder or inner polygonal hole (124) of the sun gear cylinder (121), and/or the protruding polyhedral cylinder or the inner polygonal hole (143) of the stud (140) head to accept drive by randomly coupled pulling tool or drive by rotary driving devices or drive by fixing, combining, or removable assembly with the driving tool or device.

Aside from using various kinds of driving tools such as socket wrench, open wrench, closed wrench polygonal wrench or screwdrivers, the driving tool or device of the sun gear coaxially driven screw and nut structure further includes one or more of the following functional devices such as; 1) functional devices with torque limit; 2) functional devices which can adjust and set the required torque limit; 3) functional device with drive torque analog or digital display; 4) functional device that display drive torque with sound or voice; 5) functional device that displays drive torque with lamps.

The invention claimed is:

1. A screw and nut structure coaxially driven by a sun gear, comprising:
   a stud having an axial blind hole for rotatably receiving a boss of a sun gear cylinder, said sun gear cylinder having sun gear formed thereon or integral therewith and a polyhedral structure at a top end for engaging a driving tool to cause said sun gear to rotate,
   a cover arranged to be secured to a top end of the stud, said cover providing protection for said sun gear cylinder and at least one planetary gear and including an opening to enable engagement between said polyhedral structure of the sun gear cylinder and said driving tool; and
   a drivable nut having an exterior including a surface with a polygonal shape and an interior including an internally threaded portion and a ring gear formed in the nut or integral therewith, said nut being threaded onto said stud when rotated by the said sun gear and said planetary gear;
   wherein said cover includes a central opening for rotatably receiving a sun gear cylinder, and an opening for rotatably mounting a planetary gear,
   wherein rotation of said sun gear causes rotation of the ring gear via the planetary gear to exert a magnified driving force on the nut, and
   wherein said cover is secured to said stud by at least one threaded jack post, said jack post being threaded into an opening in a top of said stud and extending through said planetary gear, said planetary gear being rotatable around said jack post.

2. A screw and nut structure coaxially driven by a sun gear as claimed in claim 1, wherein said polyhedral structure of said sun gear cylinder is a post having a polygonal shape that extends through said opening in said cover, or a blind hole having a polygonal shape for receiving said driving tool.

3. A screw and nut structure coaxially driven by a sun gear as claimed in claim 1, wherein said blind hole of said stud further including a polygonal hole for receiving an end of said driving tool, said driving tool extending through said opening in said cover and an opening in said sun gear cylinder for driving said stud to rotate with said sun gear.

4. A screw and nut structure coaxially driven by a sun gear as claimed in claim 1, wherein the driving tool is integral with the sun gear cylinder.

5. A screw and nut structure coaxially driven by a sun gear as claimed in claim 1, wherein said driving tool is driven manually, by a fluid motor, by mechanical power, or by electric power.

6. A screw and nut structure coaxially driven by a sun gear as claimed in claim 1, wherein the stud structure extends from a structural element, and wherein a fixed element is sandwiched between the structural element and the nut, the nut being rotated by the driving device to lock or release the fixed element.

7. A screw and nut structure coaxially driven by a sun gear as claimed in claim 1, wherein a bottom end of the stud structure is screwed into a screw hole of a structural element and the nut is screwed on the stud structure in order to lock or release the fixed element positioned between the nut and the structural element.

8. A screw and nut structure coaxially driven by a sun gear as claimed in claim 1, wherein a bottom end of the stud structure penetrates through a structural element, said nut being threaded onto the stud structure to lock or release the fixed element.

9. A screw and nut structure coaxially driven by a sun gear as claimed in claim 1, wherein the bottom end of the stud structure includes a polygonal bold head, a polygonal surface and curved bolt head, or a threaded section arranged to be threaded into a second nut.

\* \* \* \* \*